Dec. 28, 1937.     C. A. BIRKEBAK     2,103,315
LATHE
Filed June 20, 1935     3 Sheets-Sheet 1
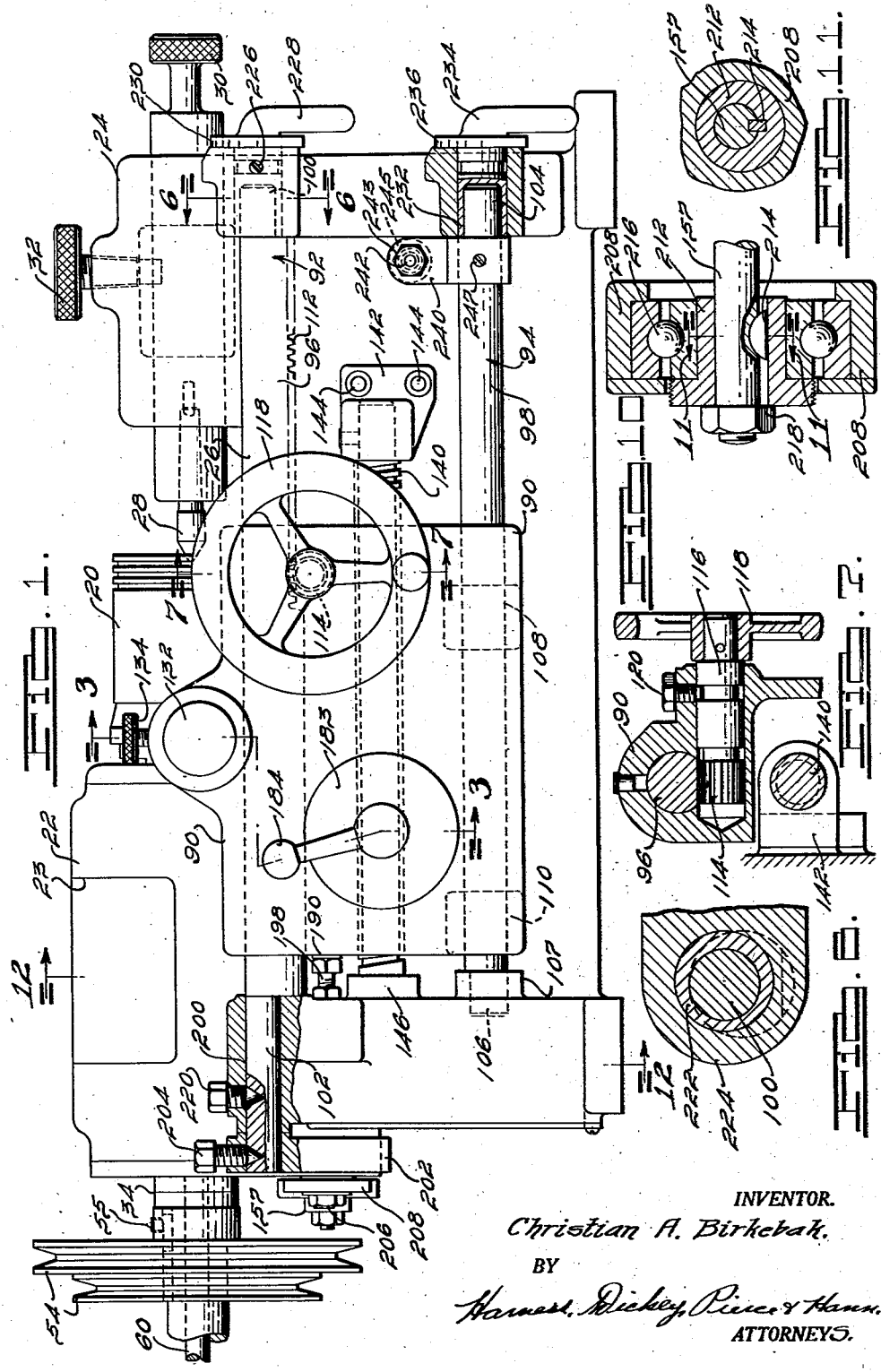
INVENTOR.
Christian A. Birkebak,
BY
ATTORNEYS.

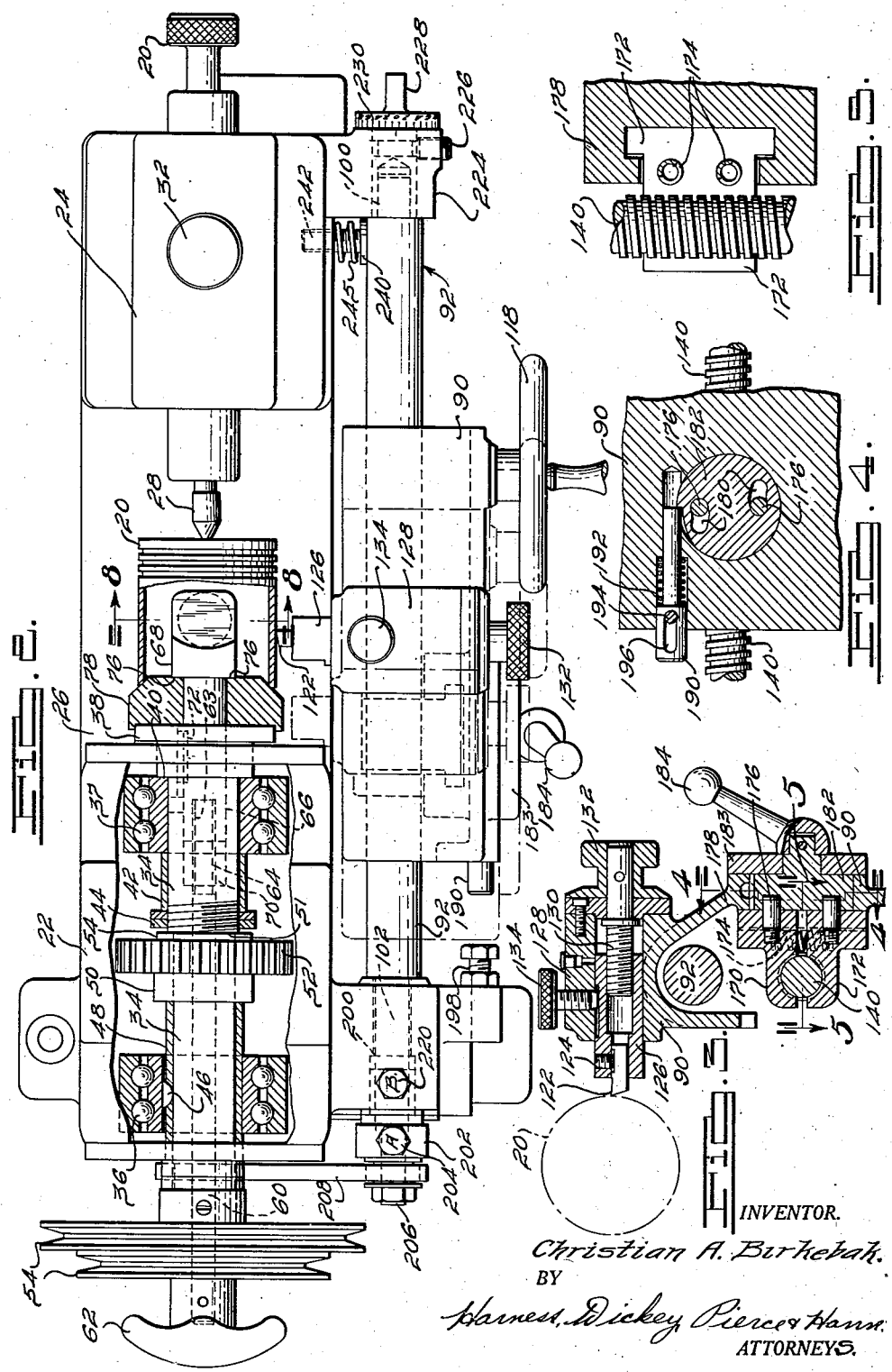

Dec. 28, 1937.   C. A. BIRKEBAK   2,103,315
LATHE
Filed June 20, 1935   3 Sheets-Sheet 3
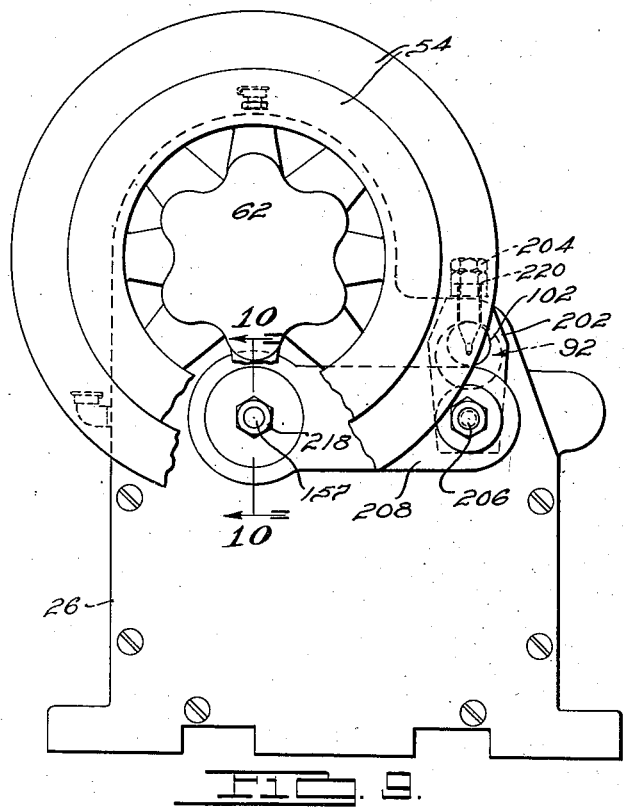
FIG. 9.
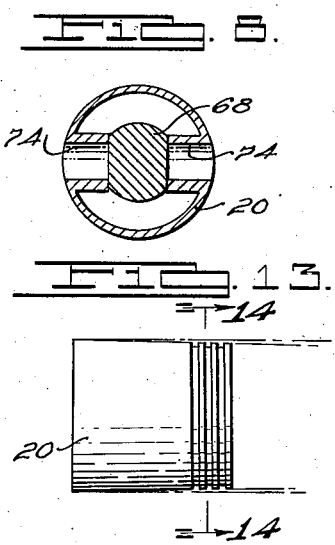
FIG. 8.
FIG. 13.
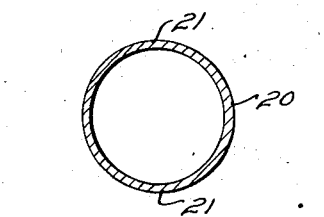
FIG. 14.
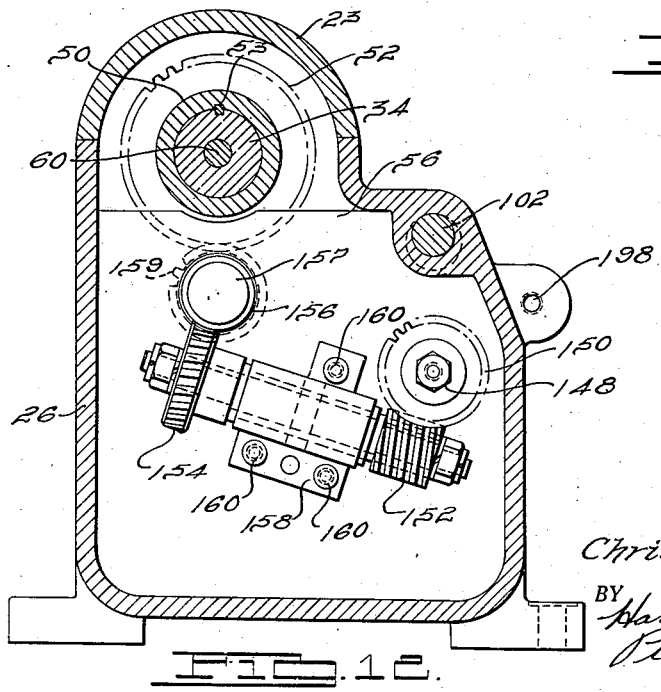
FIG. 12.
INVENTOR.
Christian A. Birkebak.
BY Barnes, Dickey,
Pierce & Mann.
ATTORNEYS.

Patented Dec. 28, 1937

2,103,315

UNITED STATES PATENT OFFICE 2,103,315

LATHE

Christian A. Birkebak, Detroit, Mich., assignor to Ex-Cell-O Corporation, a corporation of Michigan Application June 20, 1935, Serial No. 27,506

7 Claims. (Cl. 82—2)

The present invention relates to improvements in machine lathes.

The object of the present invention is to provide a lathe capable of machining non-circular objects.

It is also an object of the present invention to provide a lathe capable of machining a tapered object.

It is also an object of the present invention to provide a lathe construction in which the tool carriage is given oscillatory motion in order to produce a non-circular machining action.

It is also an object of the present invention to provide a lathe construction of the last mentioned type embodying mechanism capable of causing the tool carriage to oscillate a plurality of times during each revolution of the lathe spindle to thereby provide for a substantially non-circular machining action.

It is also an object of the present invention to provide a lathe construction which includes a tool carrier which may be adjusted to provide a tapered machining action.

It is also an object of the present invention to provide a lathe construction in which the tool carriage is vertically supported on the front face of the lathe.

It is also an object of the present invention to provide a lathe construction of the last mentioned type in which the tool carriage is supported on a pair of eccentric shafts, and in which the tool carriage is advanced by a fixed lead screw.

It is also an object of the present invention to provide a lathe construction of the last mentioned type and embodying means to rotate at least one of the eccentric shafts in order to produce a non-circular machining action.

It is also an object of the present invention to provide a lathe construction embodying eccentric shafts to support a tool shaft and embodying means to adjust such shafts to provide a tapered machining action.

It is also an object of the present invention to provide a lathe construction embodying one or more eccentric shafts to support the tool carriage in which the supporting chassis may be adjusted to take up the play in the supporting structure.

It is also an object of the present invention to provide a lathe construction embodying convenient means to alternatively adjust the lathe for circular or non-circular machining.

It is also an object of the present invention to provide a lathe construction of the last mentioned type by which the adjusting means comprises an active and a dummy screw which may be alternatively positioned and the alternative positions of which readily indicate the adjustment.

It is also an object of the present invention to generally improve the construction of machine lathes and to provide a machine lathe which is economical of manufacture and which is positive and accurate in operation.

Other objects and advantages of the present invention appear in the following description and the appended claims.

In the drawings, throughout which corresponding reference characters designate corresponding parts:

Fig. 1 is a view in side elevation of an illustrative embodiment of the present invention;

Fig. 2 is a top plan view, with certain of the parts broken away, of the embodiment shown in Fig. 1, but with the tool carriage placed to the right from the position shown in Fig. 1;

Fig. 3 is a view in vertical section taken along the line 3—3 of Fig. 1;

Fig. 4 is a view in vertical section taken along the line 4—4 of Fig. 3;

Fig. 5 is a view in vertical section taken along the line 5—5 of Fig. 3;

Fig. 6 is a view in vertical section taken along the line 6—6 of Fig. 1;

Fig. 7 is a view in vertical section taken along the line 7—7 of Fig. 1;

Fig. 8 is a view in vertical section taken along the line 8—8 of Fig. 2;

Fig. 9 is a view in end elevation of the embodiment shown in Figs. 1 and 2;

Fig. 10 is a view in vertical section taken along the line 10—10 of Fig. 9;

Fig. 11 is a view in vertical section taken along the line 11—11 of Fig. 10;

Fig. 12 is a view in vertical section taken along the line 12—12 of Fig. 1;

Fig. 13 is an illustrative elevational view illustrating the tapered construction produceable in the practice of the present invention; and Fig. 14 is a view in vertical section taken along the line 14—14 of Fig. 13, and illustrating the elliptical construction produceable in the practice of the present invention.

In the form illustrated, the present invention comprises generally a supporting bed plate, head and tail stock between which the piece or stock to be worked up is supported for rotation by the head stock, and a tool carriage movable along the bed plate. Any conventional mechanism may be utilized to rotate the work spindle. Preferably, and as illustrated, the tool carriage lead screw is suitably geared to the work spindle driving mechanism so that a single source of power is sufficient for the lathe.

The tool carriage, which may embody conventional means to support and present a tool to the stock, is movably supported on the bed plate, and is connected to a lead screw for movement along the face of the bed plate. The support for the tool carriage is also arranged so that, in machining non-circular surfaces, the tool carriage may be oscillated inwardly and outwardly with respect to the work, in timed fixed relation to the rotation of the work. The arrangement is also such that in machining tapered work the tool carriage support may be adjusted so that as the tool carriage advances along the bed plate the tool carriage is progressively moved inwardly or outwardly with respect to the work.

As illustrated, the support for the tool carriage comprises an upper and a lower eccentric shaft suitably secured to the bed plate. The oscillatory movement of the tool carriage is produced by oscillating the upper eccentric shaft in timed relation to the rotation of the work and work spindle. As illustrated, the construction is arranged to produce elliptical machining and, accordingly, the connections between the upper eccentric and the driving or work spindle are such that the eccentric makes two oscillations for each revolution of the spindle. In the course of the oscillatory movement, the tool carriage oscillates about the lower eccentric shaft as an axis.

In accordance with the present invention, and as illustrated, the connections between the tool carriage and the lead screw are able to take up the movement of the tool carriage so that the lead screw may be fixed in position with respect to the bed plate. This arrangement, as will appear more fully hereinafter, substantially simplifies the construction of the lead screw and associated parts.

The upper eccentric shaft is readily connectible to and disconnectible from the oscillatory mechanism, so that the change from circular to non-circular machining action is readily accomplished. The adjusting means comprises an active and a dummy screw, which may be given simple identifying characters, and the positions of which are interchangeable. With the screws in one relative position, the active screw keys the upper shaft to the oscillating mechanism and when in the reverse position the upper shaft is released from such oscillating mechanism and held against movement.

A corresponding end of each of the eccentric supporting shafts is adjustable towards and away from the bed plate, and suitable indicating gauge mechanism is provided to indicate the positioning of these members. As will be understood, depending upon the spacing of the adjustable ends of the shaft from the bed plate, relative to the spacing of the other ends thereof from the bed plate, the tool carriage follows a path either at an angle to or parallel to the axis of the stock or work, resulting in either a tapered or non-tapered machining action.

As will be understood, it is desirable to maintain any play in the mounting of the tool carriage on the eccentric shaft within relatively close limits to prevent chattering of the cutting tool and to permit close machining limits. In accordance with the present invention, this may be conveniently accomplished by slightly rotating the lower eccentric shaft with respect to the upper so as to vary the axial spacing of the shafts.

Considering the above discussed elements in more detail, and referring to Figs. 1, 2 and 9, illustrative stock 20 is supported between head stock 22 and tail stock 24. Head stock 22 is fixed in position on table 26, in any conventional manner, and is provided with an opening, normally closed by plate 23, to afford access to the interior thereof. Tail stock 24 is preferably slidably supported on table 26, and arranged to be locked in position at any suitable point therealong, in any conventional manner. Dead center 28 is preferably adjustable longitudinally of tail stock 24, by adjusting screw 30, and may be locked in any desired position by locking screw 32.

The driving spindle for stock 20 comprises the tubular sleeve 34, which is journaled in head stock 22 within suitable ball bearing assemblies 36 and 37, and the enlarged end of which extends through the end of head stock 22 to form the face plate 38. Roller bearing unit 37 is seated between the shoulder 40 formed on sleeve 34, and the bushing 42, which is retained in place thereon by lock nut 44. Ball bearing unit 36 is suitably keyed, by key 46, to sleeve 48, which surrounds sleeve 34. Sleeve 48 also abuts against one hub 50 of gear 52, and retains the opposite hub 51 of the latter in engagement with the shoulder 54, formed on sleeve 34. Gear 52 is keyed to sleeve 34 by key 53 (Fig. 12). Sleeve 34 extends beyond the outer end of stock 22 and the driving pulleys 54 are secured thereto by set screw 55. As will be understood, pulleys 54 may be connected to any suitable source of power.

The shank 60 of adjusting wheel 62 extends through sleeve 34 and is externally threaded at its inner end 63, to cooperate with the internal threads 64 provided in the shank 66 of boss 68. The shank 66 of boss 68 is slidable in the recess 70 formed in sleeve 34, but relative rotation between spindle 68 and sleeve 34 is prevented by key 72.

As will be understood, the end formation of boss 68 is determined by the character of the stock to which it is to be connected. The illustrated stock 20 is the piston of an internal combustion engine, and accordingly as best shown in Fig. 8, the end of boss 68 is shaped to fit somewhat snugly between the bearing bosses 74 which conventionally extend inwardly from the side walls of piston 20.

Rotation of hand wheel 62 in one direction draws boss 68 inwardly within sleeve 34, finally bringing the shoulder 76 into solid engagement with the collar 78, and forcing the latter into engagement with face plate 38. A rigid driving assembly is thus provided. Thereafter stock 20 may be placed over the end of boss 68, as illustrated in Figs. 2 and 8, with the rim of stock 20 in continuous engagement with the surface of collar 78, and dead center 28 advanced into engagement with the surface of stock 20. With this arrangement it will be understood that the driving torque to piston 20 is applied through boss 68 and the members 74 within piston 20, and that collar 78 cooperates with dead center 28 in centering piston 20.

Tool carriage 90 is supported on an upper eccentric shaft 92 and a lower eccentric shaft 94. The upper and lower shafts 92 and 94 each include a circular central section 96 and 98, respectively, and end sections of reduced diameter 100 and 102, and 104 and 106, respectively, which are eccentrically formed with respect to the central sections, and are supported on table 26 in the manner described later. The central section 96 of shaft 92 is slidably received in a correspondingly shaped section of carriage 90, as best shown in Fig. 7. The central section 98 of shaft 94 passes through two bearing sections 108 and 110 formed at the lower corners of carriage 90.

The underside of shaft 92 is formed with rack teeth 112 for cooperation with a spur gear 114 (Fig. 7). Spur gear 114 is secured on a shaft 116, to which a hand wheel 118 is suitably secured, and which is retained in position with respect to carriage 90 by set screw 120. The connection between spur gear 114 and rack teeth 112 includes some free spacing of the teeth, permitting a limited amount of rotation of shaft 92 with respect to carriage 90 for a purpose described later. As will be understood, rotation of hand wheel 118 in one direction or the other advances carriage 90 along table 26 in a corresponding direction, providing a manual adjustment of the position thereof.

The cutting tool 122 may be supported on tool carriage 90 in any desired conventional manner. A preferred construction is illustrated in detail in Fig. 3, in which cutting tool is secured by set screw 124 in a sleeve 126. Sleeve 126 is slidably supported in the outer sleeve 128, which in turn is suitably supported in any desired manner on carriage 90, and is internally threaded to the adjusting screw 130. Handle 132 is provided to turn screw 130. As will be understood, rotation of the screw 130 moves tool 122 inwardly or outwardly with respect to stock 20. Locking screw 134 is provided to lock the tool 122 in any desired position.

Referring particularly to Figs. 1, 4 and 5, the illustrated lead mechanism for tool carriage 90 comprises the screw 140, one end of which is rotatably supported in standard 142, which is, in turn, secured to table 26 by bolts 144. The other end of screw 140 passes through the collar 146 formed in table 26, and, as shown in Fig. 12, has a worm gear 150 secured upon it in any suitable manner, as by the nut 148. The worm gear 150 meshes with the worm 152, secured on the same shaft as the worm wheel 154, and which in turn meshes with worm 156. Worm 156 is suitably secured to a shaft 157 which is suitably journalled in and passes through an intermediate wall 56 formed in table 26. A spur gear 159 secured on shaft 157 meshes with gear 52. The bearing standard 158 for gears 152 and 154 is suitably secured to wall 56 by bolts 160.

Any desired mechanism may be employed to clutch tool carriage 90 to lead screw 140, and to unclutch it therefrom. The illustrated mechanism, as best shown in Figs. 3, 4 and 5, comprises the two jaws 170 and 172 which are normally biased apart, releasing screw 140, by springs 174, which are seated within the jaws 170 and 172. The actuating studs 176 extend into openings formed in the jaws 170 and 172, through an intermediate member 179, and into slots 180 of an adjusting member 182. Member 182 is rotatably secured to the carriage 90 by cover plate 183, and a suitable handle 184 is connected to it. This general arrangement is conventional, and it will be understood that rotation of member 182 to the position shown in Fig. 4 draws the two studs 176 together, forcing jaws 170 and 172 into actuating engagement with lead screw 140. Rotation of member 182 in a clockwise direction as viewed in Fig. 4, separates pins 176 somewhat, and results in a separation of jaws 170 and 172. An automatic release of the jaws is provided by the plunger 190, which is slidably received in a cooperating opening formed in carriage 90, and is biased to an extended or illustrated position by a spring 192. A pin 194 limits its outward movement, being passed through the elongated slot 196 in pin 190 and suitably secured in carriage 90. It will be understood that inward movement of pin 190 rotates member 182 in the clockwise direction as viewed in Fig. 4 and releases the jaws 170 and 172 in the manner just described. Pin 190 is positioned to engage a stationary part of the lathe, when carriage 90 reaches or approaches the limit of its movement. As shown in Figs. 1 and 2, stopping stud 198 is secured to table 26 for cooperation with pin 190.

Referring to Figs. 3 and 5, in order to accommodate the oscillatory motion of the tool carriage 90, later described, the connection between the carriage and the lead screw 140 includes the intermediate member 178, which may be secured to carriage 90 in any suitable manner, and which is slotted to receive the cooperating jaws 172 and 170. The connection allows a limited amount of transverse movement between jaws 170 and 172 and member 178, but restrains longitudinal movement. The play thus provided permits carriage 90 to oscillate with respect to the relatively stationary lead screw 140.

Considering now the mounting of the eccentric shafts 92 and 94 on the table 26, and referring particularly to Figs. 1, 2 and 9, the end 106 of shaft 94 is pivotally supported in a boss 107 formed in table 26. The end 102 of shaft 92 passes through a cooperating opening 200 formed in table 26, and extends sufficiently beyond the table 26 to receive the oscillating arm 202. Arm 202 is normally free to rotate with respect to portion 102, but may be secured thereon by the active set screw 204. Arm 202 terminates in a trunnion 206, to which one end of rocker arm 208 is pivotally connected. The other end of rocker arm 208 is eccentrically connected to shaft 157, which as previously mentioned and as shown in Fig. 12, is driven by the main spindle gear 52. The eccentric connection for rocker arm 208 is shown in detail in Figs. 10 and 11, and comprises the eccentric sleeve 212, keyed to shaft 157 by key 214, and journalled in the circular end of arm 208 within the roller bearing unit 216. The nut 218 is provided to retain eccentric 212 in place on shaft 157.

With this arrangement, it will be understood that rotation of spindle 34 and consequently of stock 20, is accompanied by an oscillatory motion of rocker arm 208 and arm 202, resulting in a reciprocation of shaft section 102. Because of the eccentricity between the central section 96 of shaft 92 and the end section 102, this reciprocation of section 102 causes the upper edge of tool carriage 90 and tool 122 to move inwardly and outwardly with respect to stock 20. It will be further understood that the number of inward and outward movements of carriage 90 and cutting tool 122 for each revolution of stock 20 is determined by the gear ratio between the driving gears 52 and 159 (Fig. 12). The illustrated ratio is two to one, so that an elliptical shape of stock 20 is produced, as illustrated in Fig. 14, in which the portions 21 are drawn from a major axis produced by the periodic withdrawal of tool 122 from stock 20. It will be further understood that the relation between the major and minor axes of the elliptical shape produced may be readily adjusted by replacing eccentric bushing 212 with a corresponding bushing that is of greater or less eccentricity as desired.

It will be understood that by removing the set screw 204 (Figs. 1 and 2), the arm 202 is released from the shaft section 102 so that the latter is unaffected by movement of rocker arm 208. Under these conditions, no oscillatory movement of tool carriage results, and the lathe is effective to produce a circular shape of stock 20. By placing set screw 204 in the opening illustrated as occupied by screw 220, rotation of shaft 92 is prevented.

In accordance with the present invention, a convenient indication of the condition of the lathe is provided by the use of the set screw 204 and the cooperating dummy set screw 220, the upper surfaces of which are preferably provided with distinguishing characteristics, such as A and B. When in the relative positions shown in Fig. 1, the lathe, as described, is effective to produce an elliptically shaped stock 20. By reversing the positions of the two screws 204 and 220, the lathe is conditioned, as described, to produce a circularly shaped stock 20.

It will be noted that carriage 90 oscillates about shaft 94 as an axis, and that the radius of rotation, which is equal to the spacing between centers of shafts 92 and 94, is larger than the radius of oscillation of the axis of the central section 96 of shaft 92, which is equal to the eccentricity of the section 96 of shaft 92. The oscillatory movements are, however, relatively minute, and it has been found, in the practice of the present invention, that the displacements introduced by the above differences in radii of rotation may be readily absorbed by normal play in the connections between carriage 90 and shafts 92 and 94.

As previously mentioned, the ends 100 and 104 of shafts 92 and 94, respectively, are mounted for inward and outward movement with respect to table 26, to render the lathe effective to machine stocks of uniform diameter or of tapering diameter, as shown in Fig. 13. As illustrated, the mountings for sections 100 and 104 are of the eccentric type, each of which is arranged as shown in Fig. 6. Referring to Fig. 6, which corresponds to the mounting of the end of shaft 92, the section 100 is rotatably mounted within the eccentric bushing 222, which in turn, is rotatably mounted within the bearing standard 224. Bearing standard 224 is suitably secured to, or forms a part of, table 26. Eccentric bushing 222 is connected by a set screw 226 for rotation in response to an arm 228. An indicating scale 230 is provided to give a visual indication of the positions of the parts. The mounting for the end section 104 of shaft 94 is correspondingly arranged and comprises, (Fig. 1), the eccentric 232, the operating arm 234 and the scale 236. It will be understood that in each adjustment, both arms 228 and 234 should be moved through the same angle in order to maintain the carriage 90 in a vertical position. It will be understood that the adjustment thus afforded is minute and may readily be absorbed by the mountings described for the other ends of shafts 92 and 94.

It will be noted that the taper adjustment mechanism is independent of the oscillatory mechanism described above, and the lathe is thus effective to produce either circular or non-circular shapes of either uniform or tapering diameter.

As mentioned it has been found to be desirable in the practice of the present invention to provide means to adjust the spacing between the shafts 92 and 94 to prevent chattering of the tool carriage and keep the machining action within close limits. As shown in Fig. 1, this is accomplished by the member 240 and cooperating parts. Member 240 comprises a lower boss portion which is apertured to snugly receive the central section 98 of shaft 94, and an upwardly extending arm which is apertured to loosely pass over a stud 242 which is stationarily secured by being threaded into table 26. Adjusting nut 243 is threaded on stud 242 and may be turned on or off to adjust member 240. A biasing spring 245 (Fig. 2), interposed between table 26 and the arm of member 240, surrounds stud 242, and maintains the arm in engagement with nut 243. Set screw 247 is provided to lock the boss portion to shaft section 98. It will be evident accordingly that an adjustment of nut 243 correspondingly rotates shaft section 98. Because of the eccentricity of shaft 94, this rotation increases or decreases the spacing between centers of sections 96 and 98 of shafts 92 and 94 respectively. The adjustments required are relatively minute, and any movements of member 240 transversely of stud 242 involved in the adjustments are taken up by the loose connection between member 240 and stud 242.

Although a specific embodiment of the present invention has been described, it will be evident that various changes may be made in the form, number and arrangement of parts within the scope thereof, as defined in the appended claims.

What is claimed is:

1. A machine lathe comprising a table for supporting stock to be machined, a tool carriage for presenting a cutting tool to said stock, means for reciprocating said tool carriage transversely of said stock comprising a rocker arm and an eccentrically formed shaft, said rocker arm having a locking opening disposed to receive a locking screw to lock said shaft to said rocker arm, a stationary member having a second locking opening to receive a locking screw to lock said shaft against motion, and a pair of characteristically different locking screws for insertion in said openings, one of said screws being effective to produce a locking or oscillatory action and the other ineffective, whereby the condition of the machine lathe is indicated by the relative positioning of said first and second locking screws.

2. A machine lathe comprising in combination, a table, means for supporting stock upon said table for axial rotation, a carriage for supporting a tool in cutting relation to said stock, a first eccentric shaft, means supporting said shaft upon said table so as to extend generally parallel to the axis of said stock, means forming a pivotal connection between said tool carriage and said shaft, a second eccentric shaft, means supporting said second eccentric shaft upon said table so as to extend generally parallel to the axis of said stock, means forming a connection between said second eccentric shaft and said carriage whereby angular movement of said second eccentric shaft causes said tool carriage to oscillate inwardly and outwardly with respect to said stock about said first eccentric shaft as an axis, and means for selectively rotating said first eccentric shaft to effect an adjustment of the axial spacing of said first and second eccentric shafts.

3. A machine tool comprising a base, rotary work stock supporting means, a tool holder having a tool adapted to engage the work, means including a shaft extending substantially parallel to the work axis for pivotally mounting the tool holder on the base, an eccentric shaft extending substantially parallel to the first mentioned shaft and operatively engaging the tool holder for moving it inwardly and outwardly with respect to the work axis, means for rotating the work, and means for oscillating the eccentric shaft through a limited angle less than that of a complete rotation and in timed relation to the work rotation, whereby such oscillation enables moving the tool accurate and small amounts to and from the axis of work rotation.

4. A machine tool comprising a base, rotary work stock supporting means, a tool holder having a tool adapted to engage the work, means including a shaft extending substantially parallel to the work axis for pivotally mounting the tool holder on the base, an eccentric shaft extending substantially parallel to the first mentioned shaft and operatively engaging the tool holder for moving it inwardly and outwardly with respect to the work axis, means for rotating the work, means for oscillating the eccentric shaft through a limited angle less than that of a complete rotation and in timed relation to the work rotation, whereby such oscillation enables moving the tool accurate and small amounts to and from the axis of work rotation, and means for feeding the tool holder along the shafts during such oscillatory movement.

5. A machine tool comprising a base, rotary work stock supporting means, a tool holder having a tool adapted to engage the work, means including a shaft extending substantially parallel to the work axis for pivotally mounting the tool holder on the base, an eccentric shaft extending substantially parallel to the first mentioned shaft and operatively engaging the tool holder for moving it inwardly and outwardly with respect to the work axis, means for rotating the work, means for oscillating the eccentric shaft through a limited angle less than that of a complete rotation and in timed relation to the work rotation, whereby such oscillation enables moving the tool accurate and small amounts to and from the axis of work rotation, means for feeding the tool holder along the shafts during such oscillatory movement, and adjustable means for supporting the shafts at one end to enable varying their position with respect to the work axis of rotation.

6. A machine tool comprising a base, rotary work stock supporting means, a tool holder having a tool adapted to engage the work, means including a shaft extending substantially parallel to the work axis for pivotally mounting the tool holder on the base, an eccentric shaft extending substantially parallel to the first mentioned shaft and operatively engaging the tool holder for moving it inwardly and outwardly with respect to the work axis, means for rotating the work, means for oscillating the eccentric shaft through a limited angle less than that of a complete rotation and in timed relation to the work rotation, and means for adjustably moving one end of the shafts so as to vary the direction in which they extend along the work axis.

7. A machine tool comprising a base, means on the base for supporting work stock for rotation about an axis, a tool holder for supporting a tool in cutting relation to the stock, a shaft journalled on the base and extending generally parallel to the axis of stock rotation and having an eccentric portion upon which the tool holder is pivotally mounted, a second shaft disposed generally parallel to the first shaft, means for actuating the second shaft to oscillate the tool holder on the eccentric portion of the first shaft, and through a limited angle less than that of a complete rotation, and means for turning the first shaft and eccentric portion thereon so as to relatively adjust the tool holder and shafts transversely to the latter.

CHRISTIAN A. BIRKEBAK.